UNITED STATES PATENT OFFICE.

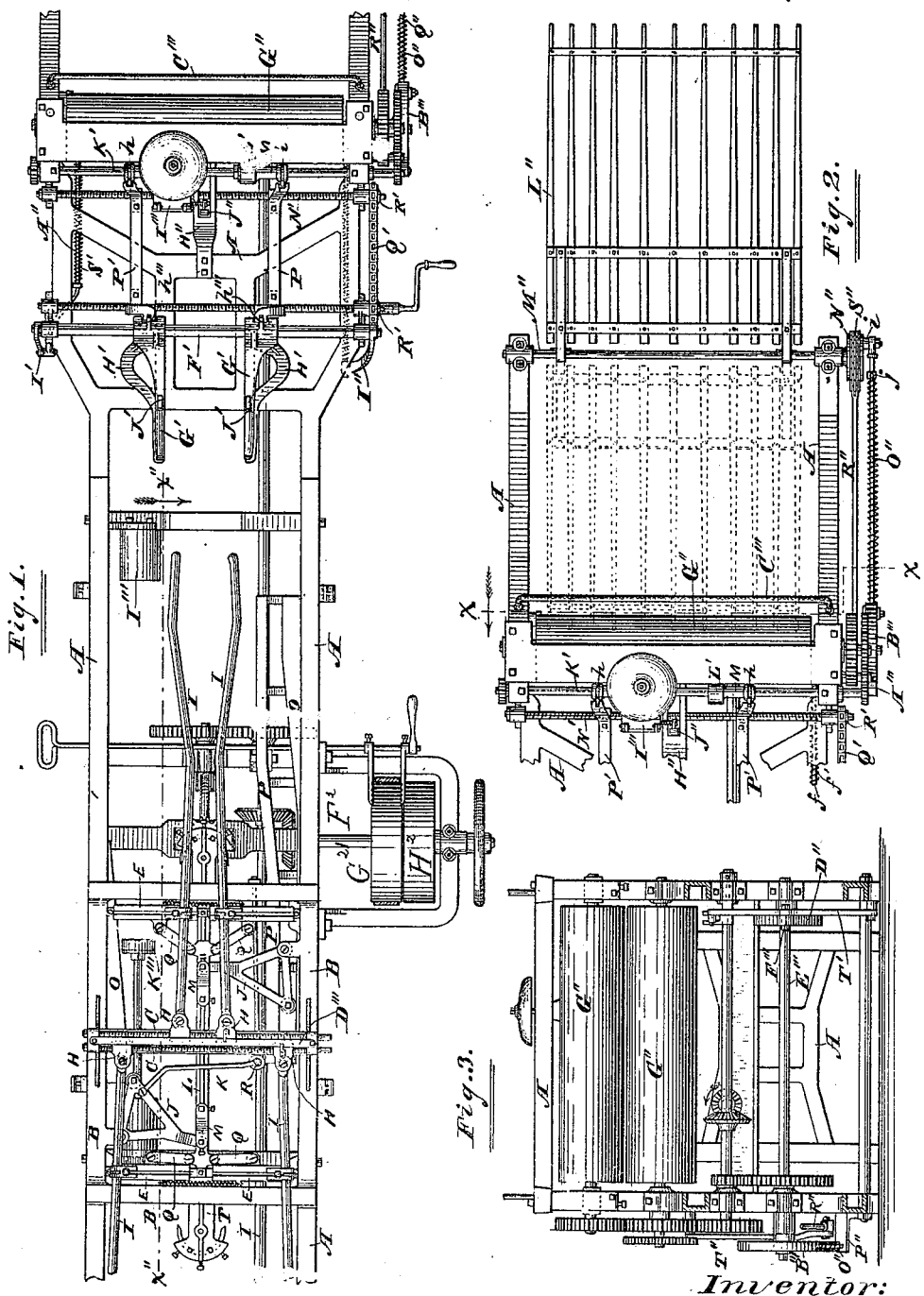

SAMUEL T. LOCKWOOD, OF CHICAGO, ILLINOIS, ASSIGNOR TO JULIET P. LOCKWOOD, OF SAME PLACE.

BAG-TURNING MACHINE.

SPECIFICATION forming part of Letters Patent No. 350,204, dated October 5, 1886.

Application filed September 21, 1885. Serial No. 177,618. (No model.)

*To all whom it may concern:*

Be it known that I, SAMUEL T. LOCKWOOD, a citizen of the United States of America, residing at Chicago, in the county of Cook and State of Illinois, have invented certain new and useful Improvements in Bag-Turning Machines, of which the following, in connection with the accompanying drawings, is a specification.

In the drawings, Figure 1 is a top or plan view of the main portion of a bag turning or reversing machine embodying my improvements. Fig. 2 is a like representation including parts not represented in Fig. 1, and showing the relation of the fly and its working mechanism to the parts shown in Fig. 1. Fig. 3 is a section in the plane of the line $x\ x$ of Fig. 2. Fig. 4 is a side elevation of the parts shown in Fig. 1. Fig. 5 is a side elevation of the parts shown in Fig. 2. Fig. 6 is a detail, the same representing, upon an enlarged scale, a part of the means employed for operating the fly. Fig. 7 is also a detail, the same being a top or plan view of the parts shown in Fig. 6. Fig. 8 is a section in the plane of the line $x'\ x'$ of Fig. 5. Fig. 9 is a section in the plane of the line $x''\ x''$ of Fig. 1. Fig. 10 is a section in the plane of the line $y\ y$ of Fig. 9. Fig. 11 is a top or plan view, enlarged, of the central part of the machine. Fig. 12 is a sectional detail upon an enlarged scale, and representing the parts shown in Fig. 2 viewed from the front thereof. Fig. 13 is a section in the plane of the line $z\ z$ of Fig. 12. Fig. 14 is a section in the plane of the line $z'\ z'$ of Fig. 13. Fig. 15 is a detail, the same being an enlarged representation of a portion of the parts shown in Fig. 13. Fig. 16 is a top or plan view of the parts shown in Fig. 15, the upper shaft, K′, being omitted. Fig. 17 is a detail in vertical section of a portion of the driving-gearing of the carriage. Fig. 18 is a top or plan view of a part or portion of the said gearing. Fig. 19 is also a detail in vertical section showing a portion of the same gearing. Fig. 20 is also a detail in vertical section showing, upon an enlarged scale, a part of the means employed for furnishing the bag turning or reversing arms with movable or sliding bearings. Fig. 21 is a detail, the same being a top or plan view of the parts shown in Fig. 20. Fig. 22 is a section in the plane of the line $y'\ y'$ of Fig. 21. Fig. 23 is a detail, the same being a side view of the sliding bearings through which the bag turners or reversers pass; and Fig. 24 is a detail, the same being a representation, upon an enlarged scale, of the stripping-rollers, and of a portion of the means employed for operating them.

Like letters of reference indicate like parts.

A represents the fixed part of the main frame, and B is a reciprocating carriage thereon.

C C are rods turning in fixed bearings on the carriage B. These rods between their bearings are made screw-threaded, the screw-threads from the center of each rod outward being reversed—that is to say, a right-hand screw and a left-hand screw are cut in each of the said rods.

D is a cross-bar rigidly applied to the carriage.

E E are slides on the bar D, the said slides being adapted to move laterally or toward the sides of the carriage. Any suitable means may be employed for permitting this sliding movement. In the example shown the slides E E are retained on the bar D, so as to permit them to slide thereon, by being made to overlap the longitudinal edges of the said bars, and by means of cross-bars $a^2$ passing underneath to the said slides, Fig. 22. The upper faces of the slides E E have therein longitudinal grooves or channels $a\ a$, which are made widest at the bottom, as is clearly indicated in Fig. 22.

F F are adjustable blocks on the slides E E. I connect the said blocks adjustably to the said slides by means of headed bolts G G, the heads of the said bolts being in the grooves or channels $a\ a$. Upon the upper or exposed ends of the said bolts I run nuts $b\ b$. In this manner I may set the blocks F F at different positions upon the slides E E by loosening the said nuts sufficiently for that purpose, and by tightening the nuts when the said blocks are set as may be desired, thereby clamping them temporarily in place. I deem it preferable, but not absolutely essential, to make small ribs $a'\ a'$ on the blocks F F, which ribs, by entering the grooves or channels a a, aid in preventing the said blocks from being twisted or turned on the slides E E.

E' E' are close spiral springs connecting the blocks E E.

H H are nuts run upon the rods C C. These nuts have split extensions c c.

I I are bag turning or reversing arms passing through the blocks F F, and pivoted or jointed to the extensions c c. I may here state that the openings in the blocks F F are beveled at their outer ends, as indicated at d d, Fig. 23, sufficiently to permit the arms I I to be vibrated horizontally therein to some extent, as indicated by the dotted or broken lines shown at d', Fig. 21. It will now be perceived that the blocks F F may be set either toward or from each other, thus bringing the working ends of the arms I I either nearer together or farther apart. It will also be perceived that the nuts H H will be either separated or moved toward each other by turning the rod C, as may be done with facility by means of a crank or lever or other suitable tool. The purpose of making provision for such adjustment is to render the arms I I capable of being adjusted to correspond to bags of different widths, all of which will hereinafter more fully appear.

J J are bell-crank levers pivoted to the carriage B.

L is a bar forming a part of the carriage, and M M are sliding blocks on the said bar. The bell-cranks J J are also pivoted to these blocks, as indicated at e e.

N N are rollers or wheels, the axles of which turn in the levers J J.

O O are fixed cams applied to the frame A. P is also a fixed cam connected to the main frame of the machine.

Q Q are links pivoted to the slides M M and to extensions $f f$, projecting from the slides E E.

K is an arm pivoted at one end to a lever, J, and carrying on its other end a wheel or roller, R.

S is an arm connected at one end with the axle of the wheel or roller R and at its other end to a plate, $g$, applied to the frame A. The arm S is simply a tie-rod to prevent the arm K and its roller from swinging backward and forward. The arm S, however, allows the arm K and its roller to be moved laterally as the rollers N and R ride upon their respective cams, as will hereinafter more fully appear.

I may here state that this machine may be either single acting or double acting, or what may be termed a "double header." I have shown one complete set of turning devices and part of a second set located at the opposite end of a double machine. The devices described (marked K R S) pertain to said second set, and are introduced in order to utilize the cam P for accomplishing the necessary movements in said second set, instead of using an additional cam therefor.

T is a double rack rigidly attached to the carriage B.

U is a rotary oscillating or vibrating shaft, having on its upper end a pinion, A', engaging the rack T.

B' is a beveled gear or pinion on the lower end of the shaft U, and this gear or pinion engages a gear or pinion, C', on a horizontal shaft, D'. The shaft U turns in bearings in a yoke, E'', mounted freely on the shaft D', which yoke is capable of oscillating on the shaft D'. I deem it preferable to extend this yoke upward around the shaft U, as is clearly indicated at $U^2$, Figs. 17 and 19, and to allow the upper part of the sleeve so formed to oscillate in a slot, $U^3$, in a fixed guide-bar, $U^4$. At each end of the rack T is a roller, $T^2$, and between two of the cogs on the pinion B' is a space sufficiently large to receive or engage the said roller, as is clearly indicated in Fig. 18. The roller $T^2$ enters between these widely-separated cogs about the time the movement of the carriage B is to be reversed.

$R^2$ is a small roller on the upper side of the pinion B', and by the time the roller $T^2$ is between these more widely separated cogs the roller $R^2$ rides against the inner side of a semi-circular guide, $R^3$, secured to the carriage near each end of the said rack, which performs the function of tilting the shaft U over so that the pinion B' will engage the other side of the rack T, and so reverse the movement of the rack.

I employ any suitable or well-known means for driving the shaft D', and, as the combination of a double rack with an oscillating shaft carrying gear for reciprocating the said rack is old and well known, I need not here further describe the means employed for the purpose of imparting a reciprocating movement to the carriage B, and I here make no claim to any special means employed for that purpose. In the example shown, $A^2$ is a spur-wheel rigidly attached to the shaft D' and engaging a spur-wheel, $B^2$, rigidly attached to a shaft, $C^2$, on which is a beveled pinion, $D^2$, also rigidly attached to the shaft $C^2$. The pinion $D^2$ engages a like pinion, $E^2$, on a shaft, $F^2$, on which is a belt-wheel or driver, $G^{21}$, and an idle-wheel, $H^2$. It will now be perceived that as the wheel $G^{21}$ is rotated this rotary movement will be communicated through the train of gearing now referred to, to the shaft D', and thence to the shaft U and its pinions, the pinion B' being in engagement with the pinion C'. The rotation of the pinion A' while engaging the rack T results in the reciprocation of the carriage B.

I desire to state that I have heretofore employed a reciprocating carriage and means for reciprocating it different from that herein shown and referred to, which different means I have described and shown in Letters Patent of the United States of America No. 297,141, granted to be the 22d day of April, 1884, for improvements in machines for turning bags.

F' F'' are square or polygonal rods or shafts having journals or spindles (see Figs. 13, 14, 15, and 16) turning in suitable bearings applied to the frame A.

G' and H' are bag holding or supporting fingers mounted on the shafts F' and F''', respectively, and I' is an arm or lever depending from the shaft or rod F''.

I'' is an arm depending from the shaft F'.

J' J' are stops upon the fingers G' G'.

K' K' are shafts, upon which are mounted sliding rollers L' L', splined to the said shafts or turning therewith while being capable of sliding thereon. These rollers L' L' have lateral extensions M' M', in the upper ones of which are annular grooves $h$ $h$, and in the lower ones of which are annular ribs $h'$ $h'$, arranged to enter the said grooves, as is clearly indicated in Fig. 12. I call these rollers "supplemental" rollers, as they co-operate with the larger stripping-rollers, to which I will hereinafter refer.

N' N' are right and left screw-rods turning in bearings in the frame A, and O' O' are nuts run upon the said screw-rods.

P' P' are bars connecting the nuts O' O' upon the different rods N' N'. One end of each bar P' P' is notched to engage the rib $h'$ of a roller, L', and the other end is curved upward, as shown at $h''$, and is notched to engage a rib, $h'''$, on the rear end of the fingers G' G'. (See Figs. 1 and 16.) The same end of each bar P' P' is in like engagement with the rear ends of the fingers H' H'.

Q', Figs. 1 and 4, is an endless chain running on sprocket-wheels R' R', rigidly attached to the screw-rods N' N'. These rods I may rotate by means of a crank, $N^2$.

S' is a pitman pivoted at one end to an arm or lever, T', pivoted at its lower end to the frame A.

A'' is a spiral spring on the pitman S'. This spring bears at one end against a fixed collar, B'', on the said pitman, and at the other end against a fixed plate, C'', through which the said pitman passes freely.

D'' is a cam adjustably mounted on a shaft, E''', which is driven by being geared in with the main driving-gearing, as shown in Fig. 3, and F''' is a small wheel or roller pivoted to the arm or lever T' and arranged for contact with the cam D''. The spring A'' performs the function of holding the fingers H' H' up against the fingers G' G' yieldingly, and also retains the roller F''' in operative contact with the cam D''. A rod, $f$, is jointed at one end to the lower end of the arm I'', and the other end of the said rod passes freely through a fixed part like the part C''. $f'$ is a spring on the rod $f$, and bears against the said fixed part and an adjustable collar, $f''$, Fig. 4, also on the said rod, to which it is secured by means of a set-screw. The operation is the same as that of the arm I', rod S', spring A'', collar B'', and plate C'', excepting that the rod $f$ is not connected to a lever, T', to produce a positive movement downward of the fingers G' G', which have, through the means described, a simple yielding movement in a downward direction, as will be hereinafter more fully described.

G'' G'' are the main stripping-rollers, which are in connection with gearing for rotating them; but I do not here make claim either to the said rollers or to any gearing for driving them, as other means than the gearing shown may be substituted therefor—such, for example, as are shown and described in the Letters Patent hereinbefore referred to. I desire to state, however, that the shafts K' K' are geared to each other, and are in working connection, as shown, with the gearing which drives the rollers G'' G'', so that all of the stripping-rollers will be rotated properly for the purpose of performing their functions, as will hereinafter be more fully explained.

In the drawings forming a part of this specification I have shown the rear working parts of the machine in operative connection or in gear more or less directly with the main or principal driver $G^{21}$, to which the power is primarily applied to the machine itself; but I have not here described all the driving-gear with particularity, as those skilled in the art will, after being herein informed of the essential features of invention, know how to set up the mere running-gear, which may be varied without a departure from the principle and scope of my invention.

H'' is a fixed arm or guide passing between the shafts K' K'.

I''' is a well-known registering apparatus attached to the frame A, and J'' is a trip depending therefrom in the direction of the arm H''.

As I do not here intend to claim any features of construction relating to the registering mechanism, I have not fully shown and described the same, as any registering apparatus which may be operated substantially in the manner hereinafter described will serve the purpose intended.

L'' is the fly. This fly is rigidly attached to a shaft, M'', turning in bearings in the rear part of the frame A.

N'' is a wheel or pulley rigidly mounted on the shaft M'', and $i$ is a stud or pin projecting laterally from the said wheel or pulley.

O'' is an arm or rod turning at one end on the pin $i$, and $j$ is a fixed collar on the rod O''. The opposite end of the rod O'' passes freely through a fixed plate, P''.

Q'' is a spiral spring on the rod O''. One end of this spring bears against the collar $j$ and the other against the plate P'', the action of the spring being in the direction of the wheel N''.

R'' is a rod, to one end of which is connected a chain, S'', fastened at its rear end to the perimeter of the wheel N''.

T'' is a lever pivoted at its upper end (see Fig. 5) to the frame A, and the rod R'' is pivoted to the lower end of this lever.

A''' is a small wheel or roller on the lever T''.

B''' is a cam adjustably mounted on the shaft E'''. The roller A''' is arranged to bear upon the working part or edge of the cam B'''.

C''' is a bridge or rest extending across the machine at the rear of the rollers G'' G''.

H''' is a removable table or cover.

I may here state that the cams B''' and D'' may be applied adjustably to their respective shafts in any well-known or suitable way. I prefer to render them adjustable by applying arms H$^{12}$ and I$^2$ rigidly to their shafts, respectively, and on these arms are screw-pins H$^{13}$ and I$^{13}$, one being on each arm. These cams each have curved slots therein, as shown at $a^{12}$ and $a^{13}$, respectively, Figs. 4 and 13, the screw-pins serving, respectively, to clamp the said cams to the said arms, it being understood that the cams may be turned or slightly rotated on their shafts. It will now be perceived that by loosening the said pins the cams may be adjusted, and then clamped in place by tightening the pins. The arms above referred to I have represented in broken or dotted lines in the figures last named. I desire to state, however, that I do not here intend to restrict myself to the precise means now described for rendering the said cams adjustable.

The operation of the machine now described is as follows: The attendant or operator places a pile of bags upon the table or cover H''', the mouths or open ends of the bags being toward the fingers G' and H', which at the beginning of the operation are together, as is clearly indicated in Figs. 4 and 13. The machine is then set in operation by connecting it with driving mechanism in any well-known way. The carriage B is thereby reciprocated or moved back and forth to and from the bag-holding fingers referred to. As the carriage is thus reciprocated the bag turners or reversers I I are moved with it; but before their free ends reach the bag-holding fingers the operator slips a bag upon the latter as far as the stops J' J' will permit. Before the bag-turning arms or reversers I I reach the bag-holding fingers the lower pair of the said fingers move downward, as indicated by the dotted or broken lines shown in Figs. 4 and 13. The carriage, as before stated, may be reciprocated either in the way described or in any well-known or suitable manner, and the fingers H' H' assume their lower position, for the reason that the cam D'', while rotating in contact with the roller F''', draws the rod S' rearward, thus partly rotating the shaft F''', through the medium of the arm I', and the arms H' H', being mounted on a square or polygonal part of the said shaft, are thereby caused to swing or vibrate downward to an extent corresponding to the throw of the cam D''. The time at which this downward vibration begins is regulated by adjusting the said cam upon the shaft E'''. The fingers G' and H', being in the bags at the time of this downward movement of the lower pair of fingers, will be opened, and as the arms I I move toward the bag on the said fingers the said arms, by their continued movement, push the said bag toward the rollers G'' G''; but the mouth of the bag being held upon the said fingers is the last to move in that direction; consequently the bag will be turned or reversed, and the still further movement of the arms I I draw the bag from the fingers G' and H' and present its bottom or closed end to the stripping-rollers, the reversing-arms being then inside of the reversed bag. As the bag is thus presented to the stripping-rollers the latter pinch its closed end and draw it off from the arms I I, and at the same time the movement of the carriage is reversed and the said arms move out of the bag. However, before the bag reaches the rollers G'' G'' it passes between the supplemental rollers L' L', and is pinched by them before it leaves the arms I I. By this means the bag is presented or fed with certainty to the rollers G'' G'' without rendering it necessary to have the said arms strike the said rollers forcibly, and a considerable blow or jar is thus avoided. As each bag passes toward the stripping-rollers it strikes and moves the trip of the registering apparatus I''', and a count or tally is made in this manner for each bag which is presented to the stripping-rollers. The indicator or register, while the machine is in operation, indicates the number of bags that have been reversed up to any given time. The bags which are presented to the stripping-rollers are fed by them to the fly L'', which, as each bag passes from the stripping-rollers, is raised or swung upward to a position to receive the bags, and as each bag passes wholly from the stripping-rollers the fly descends and lays the bag upon the floor. This operation is repeated as each bag is reversed, and the bags will be piled in regular order one upon each other, as represented at $a^2$, Fig. 5. As the cam D'' revolves, the roller F''' on the arm T' remains in contact with it, and the form of the cam is such as to allow the rod S' to move forward after each bag is drawn from the bag-holding fingers. The spring A'', which exerts its force in a forward direction, produces this continued contact, and also insures forward movement of the rod S'. The latter, being in connection with the arm I', rotates the shaft F'' sufficiently to throw the fingers H' H' upward against the fingers G' G', so that the latter will be in a position for receiving another bag. The fly L'' is raised by reason of the contact of the roller A''' with the cam B''', the lower end of the lever T'' being in connection with the rod R'', and the latter being connected to the roller N'' by means of the chain or other flexible connection S''. The direction of the rotation of the wheel N'' is reversed by means of the spring Q'' on the rod O'', which spring also insures the contact of the roller A''' with its cam. The bags, if not all of precisely the same width, though intended to be so, may be easily applied to the bag holding or reversing fingers, which are set apart a distance less than the width of the bags, and the upper pair of fingers, being yielding downwardly, compensate for any slight variation in the width of the bags. The reversing-arms, by their lateral or spreading movement, hereinafter described, spread out the bags to their extent, and they are then pressed by the stripping-rollers and delivered to the fly and piled one upon the other.

I have now described in general terms the mode of operation of this machine, and for further general description of its operation I may refer to the Letters Patent hereinbefore mentioned. There are, however, a number of details of construction not shown and described in the said Letters Patent, by means of which I have aimed to perfect the operation of the machine, and I will now refer to these details and their mode of operation. It will be perceived, particularly on reference to Fig. 11, that the rotation of the screw-threaded rods C C will cause the nuts H H thereon, respectively, to be more or less separated from each other, and that this movement of the said nuts will make the arms I I more or less near each other. It will also be perceived that the slides E E, by being movable laterally on the bar D, also carry the blocks F F to and from each other, thus shifting the position of the bearings or fulcrums of the arms I I. It is also to be remembered that the blocks F F are adjustable on the slides E E. By this means I am enabled to set the arms I I at varying distances apart, so that they may be adapted to perform their work upon bags of varying widths. The slides E E are operated or moved on the bar D for the reason that, as the carriage B moves toward the arms G' H', the roller N on bell-crank lever J will, during the movement of the carriage, travel on the cam O. The contact of roller N with the cam O results in tilting the lever J in such a manner as to move the slide M forward or toward the slides E E. As these slides are linked to the block M by means of the arms or links Q Q, which are inclined, as shown, the slides E E are pushed apart from each other, and the movement of the slides M is sufficient to reverse the inclination of the said arms to a slight extent, so that the blocks E E will thereby be rigidly, though temporarily, locked when so separated. In other words, the slide M and the arms or links Q Q operate somewhat as toggles. This lateral movement of the slides E E takes place after the arms I I have entered the bags, and the bags are thereby spread or held by these arms with sufficient tension to present the bags in their fully-spread condition to the stripping-rollers, which perform the function of pressing the bags while they are being stripped. As the carriage returns for the purpose of drawing the arms I I out of the bags, the roller R, by riding on the cam P, returns the lever J to its former position, and hence the slides E E are returned to their original position, so that the said arms are again near enough at their working ends to enter the next succeeding bag. It will be perceived, particularly on reference to Fig. 1, and in connection with what has already been stated with relation to the bag-holding fingers, that these fingers may be set at a greater or less distance apart from each other in a lateral direction by turning either of the rods N' N', the said rods being connected by means of the drive-chain Q' in the manner already described. As the screw-rods N' N' are thus rotated the fingers H' and G' are either separated from each other in a lateral direction or moved toward each other, according to the direction in which the said rod or rods are turned—that is, each finger G', with its mate or the finger below it, is thereby either moved to or from the other pair of fingers. As the nuts O' O' are thus moved the bars P' P' will be moved in a corresponding direction, and this movement will result in a lateral adjustment of the rollers L' L'— that is, these rollers will be adjusted simultaneously with and in like manner as the bag-holding fingers. By these means I adjust or set the bag-holding fingers and the supplemental stripping-rollers to correspond to bags of different widths. By working the bag-holding fingers and the fly by means of cams which are adjustable I am enabled to time the movement of the said fingers and of the fly with relation to each other and the movement of the bag turning and reversing arms, so that each step in the operation of reversing or turning and stripping the bags and delivering them in a pile will be performed without confusion or at the proper time. The bridge C''' serves as a stop to the upward movement of the fly and retains it with certainty in the position in which it should be to receive the bags. To prevent the contact of the fly with this bridge or rest from making a noise, it may be covered with rubber or other soft material, forming a cushion. I may here state that I have employed means for preventing a sudden jar at the reversing of the movement of the reciprocating carriage, which means, as herein shown and described, consists of a fixed air-cylinder, I''', closed at one end, and of a piston, K''', attached to and traveling with the carriage, and having its head arranged to enter the said cylinder just before the carriage reaches the extent of its movement in either direction. I also provide means for aiding the operator in adjusting the arms I I to suit bags differing in width, and for that purpose I have employed a graduated scale or plate, D''', arranged between the screw-rods C C; and upon one of the nuts upon each of the said rods I place an index-finger, G''', to indicate where the said nuts shall be set in order that the position of the arms I I on the said screw-rods may be determined easily when bags of given width are to be operated upon. I have found that in practice a much improved result follows by arranging the upper pair of bag-holding fingers considerably above the plane in which the bag-turning arms move, and by making that pair downwardly yielding and by making the lower pair inclined, as shown, and by arranging them so that they will be below the said plane when separated from the upper pair. By this arrangement the bag-holding fingers are better adapted to bags varying in width, and the bags are withdrawn therefrom with certainty.

I desire to state that I have heretofore made application for Letters Patent of the United States of America for certain other improvements in machines for turning bags, which application was filed March 26, 1884, and is numbered 125,631. In said application I have shown and described a machine similar in some of its principal features to some of the features of construction shown and described in my Letters Patent No. 297,141, and also, when broadly considered, similar to some of the features of construction herein shown and described. For example, in my said application No. 125,631 I have shown a reciprocating carriage, laterally-yielding bow-shaped and reciprocating bag-reversing arms, separable bag-holding fingers, bag-stripping rollers, a fly, a bag-supporting table, and driving-gear for supporting and operating the working parts in such a manner that each shall perform its proper function at the proper time; and I do not therefore here intend to claim any of the features of construction shown and described either in my said Letters Patent or in my said application.

Having thus described my invention, what I claim as new, and desire to secure by Letters Patent, is—

1. The combination, substantially as specified, in a bag-turning machine, of a reciprocating carriage with a rotative right and left screw-threaded rod, C, nuts H H on the said rod, and the bag turning or reversing arms I I, pivoted or jointed to the said nuts, the said arms having fulcrums or bearings applied to the said carriage carrying the said rods, for the purposes specified.

2. The combination, substantially as specified, in a bag-turning machine, of a reciprocating carriage with a rotative right and left screw-threaded rod, C, the nuts H H on the said rod, the blocks F F, the bolts G G and their nuts, and the bag turning or reversing arms I I, pivoted or jointed to the said nuts and fulcrumed in the said blocks, all the said parts being mounted on the said carriage, for the purposes set forth.

3. The combination, substantially as specified, in a bag-turning machine, of a reciprocating carriage with a rotative right and left screw-threaded rod, C, the nuts H H on the said rod, the slides E E, the blocks F F, applied to the said slides, the lever J, slide M, arms Q Q, the arms I I, pivoted or jointed to the said nuts and fulcrumed in the said blocks, all mounted on the said carriage, and means for vibrating the lever J, for the purposes set forth.

4. The combination, substantially as specified, in a bag-turning machine, of a reciprocating carriage with a rotative right and left screw-threaded rod, C, the nuts H H on the said rod, the slides E E, the blocks F F, the bolts G G and their nuts, the lever J, the slide M, arms Q Q, and the arms I I, pivoted or jointed to the nuts H H and fulcrumed in the said blocks, all mounted on the said carriage, and means for vibrating the lever J, for the purposes set forth.

5. The combination, in a bag-turning machine, of the laterally-vibratory bag turning or reversing arms I I, the slides E E, carrying bearings or fulcrums for the said arms, and the toggle-like device M Q Q, in connection with the said slides, the carriage B, the lever J, and means for actuating said lever, substantially as and for the purposes specified.

6. The combination of the slide M, the links Q Q, pivoted to the said slide, the slides E E, the fulcrums F F, the arms I I, a bell-crank lever pivoted to the slide M and to the carriage, the fixed cams O and P, the frame A, a reciprocating carriage, and a roller in connection with the said lever, and arranged for riding on the said cams, respectively, substantially as and for the purposes specified.

7. The combination, substantially as specified, in a bag-turning machine, of the laterally-adjustable supplemental feed-rollers L' L', having extensions M' M', in one pair of which are the grooves h h, and on the other pair of which are the ribs h' h', the laterally-adjustable bag-holding fingers G' and H', the right and left screw-rods N' N', the nuts O' O', the bars P', connecting the said nuts and engaging the said fingers and ribs, the shafts F', F'', and K', and means for supporting and reciprocating the bag-turning arms, for the purposes specified.

In testimony that I claim the foregoing as my own I hereunto affix my signature in presence of two witnesses.

SAMUEL T. LOCKWOOD.

Witnesses:
F. F. WARNER,
HENRY FRANKFURTER.